Aug. 13, 1929. L. L. SCOTT Re. 17,405

OIL BURNING HEATING SYSTEM

Original Filed April 30, 1921 2 Sheets-Sheet 1

INVENTOR
Lewis L. Scott
BY Brian S. Elliott
ATTORNEY

Aug. 13, 1929. L. L. SCOTT Re. 17,405

OIL BURNING HEATING SYSTEM

Original Filed April 30. 1921 2 Sheets-Sheet 2

INVENTOR
Lewis L. Scott.
BY Bruce S. Elliott
ATTORNEY

Reissued Aug. 13, 1929. Re. 17,405

UNITED STATES PATENT OFFICE.

LEWIS L. SCOTT, OF ST. LOUIS, MISSOURI, ASSIGNOR, BY MESNE ASSIGNMENTS, TO ELECTROL INCORPORATED, OF ST. LOUIS, MISSOURI, A CORPORATION OF MISSOURI.

OIL-BURNING HEATING SYSTEM.

Original No. 1,427,700, dated August 29, 1922, Serial No. 465,835, filed April 30, 1921. Application for reissue filed January 15, 1923. Serial No. 612,866.

This invention relates to automatically controlled oil burning heating system in which the operation is initiated or discontinued according to the temperature of the room or other enclosure whose temperature is to be regulated. While not limited in application, my improved heating system is more particularly designed for use in dwelling houses and is adapted for application to furnaces which may already be installed therein.

A leading feature of the present invention is the provision of means for insuring absolute safety in operation, and in this respect is to be regarded as involving certain improvements in the safety device for combustion systems shown and described in my prior Patent No. 1,320,936 dated November 4, 1919.

One of the objects of the present invention is the provision of means for controlling the operation of an electric motor, which operates to supply oil and air for the purpose of combustion, through the medium of a thermostat located in the room whose temperature is to be regulated, in such a way as to avoid arcing at the contacts of said room thermostat and also to avoid breaking a circuit at the room thermostat. This object is effected by utilizing the thermostat merely as the medium for closing a circuit to one or the other of the magnets of a double magnet switch which switch constitutes the primary control for the motor circuit to make or break the same.

Another object of the invention is the introduction of transformer into the electrical system to reduce the voltage, when an alternating current is used, for the spark coil, safety device and, in fact, all of the electrically operated mechanism except the motor.

Another object of the invention relates to the location of a safety thermostat in the path of the projected air and fuel, and in proximity to the zone of combustion, whereby the same will be promptly affected by the heat of combustion and, in the event combustion should fail to occur, or should accidentally cease after initiation, will remain cool, or be cooled by the draft of air supplied to promote combustion whereby, according to the principle of operation of my improved system a safety device will be actuated by the current which would normally energize the motor to cut out the motor and prevent further operation of the entire system until the cause of non-combustion has been remedied.

A further object of the invention relates to an improved safety device and the means for actuating the same under conditions of non-combustion.

A still further object of the invention relates to the provision of an improved double magnet switch for controlling the motor circuit and the circuit to the spark coil.

A still further object relates to the provision of a pressure gage located in the fuel line and electrically associated through the double magnet switch with the spark plug circuit whereby the spark plug will be caused to function at a given pressure of fuel and will be automatically cut out at a predetermined higher pressure.

A still further object of the invention relates to the provision of means for spreading flame in the combustion chamber of the furnace whereby the maximum amount of heat generated may be utilized.

I wish it understood that the above enumeration of the objects of the invention is not intended to be exclusive and that other objects of the invention are concerned with the construction, combination and operation of parts, whereby the more general objects of the invention are attained, as will more clearly appear from the description of the invention to follow and from the appended claims in which the features of my invention are clearly set forth.

In the accompanying drawing—

Figure 1:
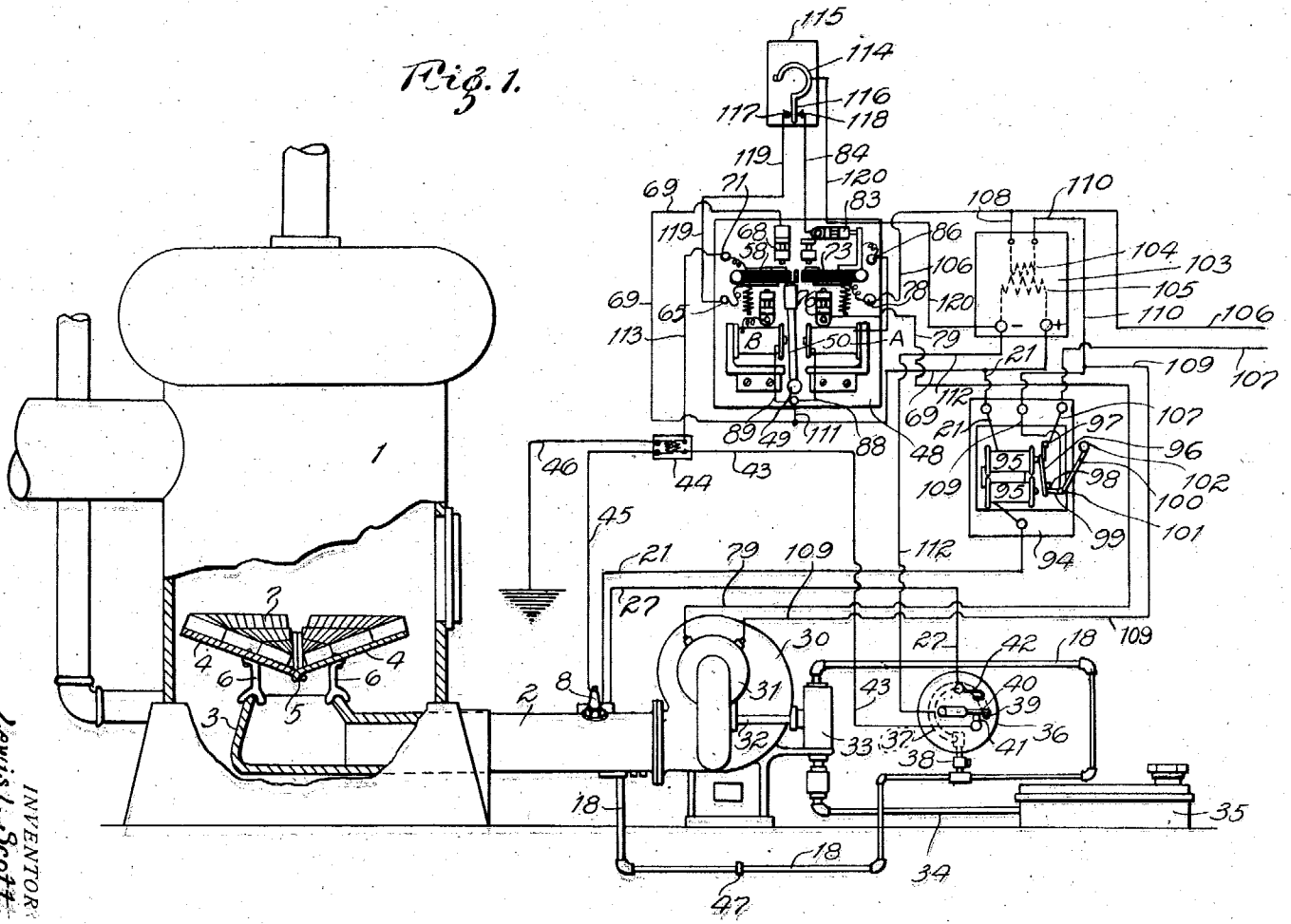
Figure 1 is a view partly in elevation and partly in section illustrating more or less diagrammatically a preferred embodiment of the invention.
Figure 3:
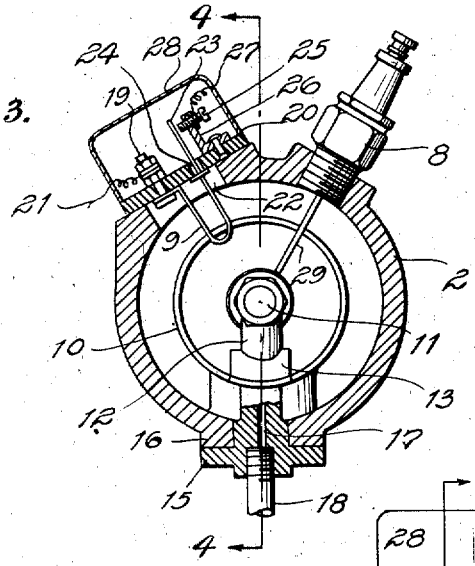
Figure 4:
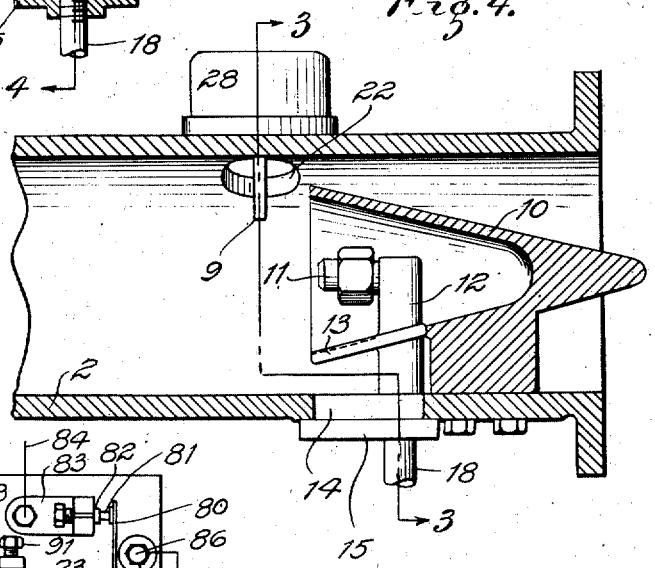

Figure 3 is a cross-sectional view on an enlarged scale through the combustion flue leading to the furnace taken on the line 3—3 of Figures 1 and 4; and Figure 4 is a longitudinal sectional view on the line 4—4 of Figure 3.

Referring now to the drawings, the numeral 1 indicates a furnace of any preferred or usual construction, and which may be of the type used for furnishing hot air, hot water or steam. Such furnace may, of course, be originally constructed for use with my system;

but assuming it had previously been used for the burning of coal, it is readily adapted for use with my improved oil burning system by removing the grate bars to make room for the burner portion of my improved system. This may be stated to comprise a combustion flue 2 having at its end a hollow chamber 3 which is inserted through the ordinary ash door of the furnace and positioned about centrally of the interior of the furnace as shown in Figure 1. The chamber 3 is open at its upper end and for the purpose of distributing the flame which is projected upward from the chamber 3, I employ a flame distributor which preferably comprises two semi-conical members 4 hingedly connected along their straight sides as indicated at 5 and supported on the upper edge of the chamber 3 by legs 6. When positioned as shown in Figure 1, the flame distributor forms a shallow cone, the apex of which is located centrally over the opening of the chamber 3 and operates to cause the flames to spread out and impinge against the side walls of the furnace instead of passing directly upward as would be the case if the distributor were not provided. Preferably I cover the upper side of the flame distributor with some refractory material such as fire brick or the like, indicated by the numeral 7 which when heated, as well understood, will act as a source of radiant heat and thus tend to prevent in some measure the dissipation of the heat through the outlet flue of the furnace. Mounted in the combustion flue 2 at a point somewhat remote from the furnace is a spark plug 8 and a thermostat 9. Mounted on the interior of the combustion flue 2 is a hood 10 which is conical in shape and has its open end preferably concentric with respect to the walls of the flue 2. Located centrally of the interior of the hood 10 near the open end thereof is a spray nozzle 11 which is mounted on a tubular member 12, which extends above and below a removable section 13 of the bottom wall of the hood and on its lower end is provided with a plug 14 fitting snugly and opening in the bottom of the flue 2 and a flange 15 which fits against the lower flat side of boss 16 on the under side of the flue 2. The flange 15 is provided with a screw-threaded aperture communicating with the bore 17 of the tubular member 12 and into this aperture is screwed the end of a pipe 18 leading from the source of fuel supply as hereinafter described. As shown by Figure 3 the thermostat 9 is mounted at one end on a binding post 19 supported on a block 20 of insulating material and to which post is connected one end of a wire 21 in a circuit to be hereinafter described. The wall of the flue 2 is provided with an opening 22, Figures 3 and 4, and the bent portion of said thermostat projects through said opening to a point slightly beyond the edge of the open end of the hood 10, and is located immediately in front of said hood. The free end portion 23 of the thermostat 9 projects upward through an opening 24 in block 20 and is positioned opposite the end of a set screw 25 mounted on a bracket 26 which in turn is mounted on the block 20. To the set screw 25 is connected one end of a wire 27 forming with the wire 21 a part of a circuit to be hereinafter described. The thermostat as a whole is covered on the exterior of the flue 2 by means of a cap 28. The terminals 29 of the spark plug 8 are substantially in the same plane as the thermostat 9, and, therefore, are located directly in front of the hood 10, but they project further into the flue than does the thermostat so that their sparking terminals are substantially in the path of the spray projected from the nozzle 11. The combustion flue 2 is secured at its outer end to the outlet opening of a blower 30, Figure 1, the fan of which is operated by a motor 31. The motor 31 operates through a shaft 32 to drive a pump 33 which operates to draw oil through a pipe 34 from an oil reservoir 35 and to force it through the pipe 18 previously referred to, to the spray nozzle 11. Connected with the pipe 18 beyond the pump is a pressure gage 36 having a Bourdon tube 37 designed to be actuated through pressure of the fluid in the pipe 18, the passage of the fluid to said Bourdon tube being regulated by a needle valve 38. The end of said Bourdon tube is provided with a pin 39 which is adapted to engage the under side of an armature 40 pivotally mounted on the gage. The free end of this armature in its lower position engages a contact 41 and in its upper position a contact 42. The contact 41 is connected by a wire 43 with one end of the primary winding of a spark coil 44. The contact 42 is connected by the wire 27, heretofore referred to, with the set screw 25, forming a contact member for the bar 23 of the thermostat 9 in the combustion flue. From one end of the secondary winding of the spark coil 44 a wire 45 leads to the spark plug 8 and from the other end of said winding a wire 46 leads to the ground. Located in the fuel line pipe 18 between the needle valve 38 and the spray nozzle 11 is a pop-valve 47 which in practice is set to open at ten pounds pressure. The purpose of this valve is to prevent oil from passing to the spray nozzle 11 until it is under sufficient pressure to cause it to be sprayed by the nozzle. The armature 40 normally rests on the contact 41 and the gage is regulated so that the pin 39 will lift said armature when a pressure of five pounds is indicated thereon. The building up of this pressure, however, is retarded by the needle valve 38 to occur just after ten pounds pressure is developed in the fuel line so that, as hereinafter explained, the spark plug will cause the ignition of the sprayed fuel before the armature 40 is raised to break the circuit to the spark plug.

I will now describe in order the double-magnet switch, the safety device and the transformer and will then describe the various circuits in which these devices are located.

Figure 2:
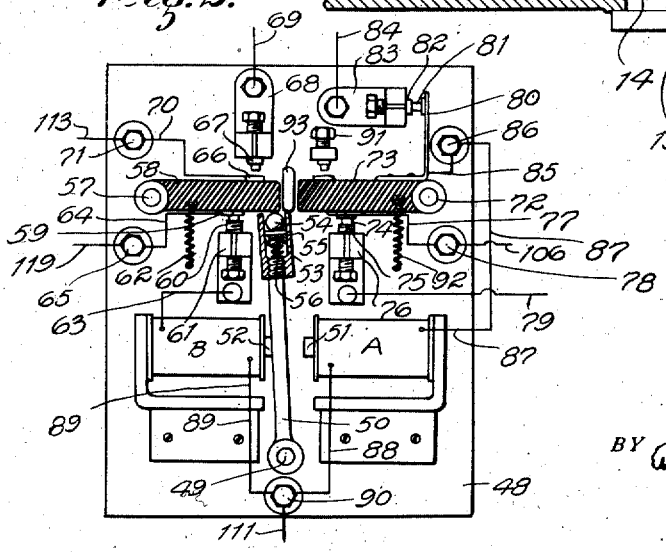
Figure 2 is a view in front elevation on an enlarged scale illustrating the double magnet switch shown in Figure 1, a part of the device being shown in section to better illustrate the construction.

Referring particularly to Figure 2, the numeral 48 indicates a switch board on which are mounted two electromagnets A, B, in opposed relation. Pivotally mounted at 49 below these magnets is an armature 50 which extends upwardly above the magnets in the space between the two cores 51 and 52 thereof, respectively. Secured on the upper end of the armature 50 is a socket member 53, open at its outer end, in which is mounted a ball 54 supported on a plunger 55 normally pressed upward by a spring 56. Pivotally mounted at one end at 57 above the magnet B is a contact member 58 having on its underside a contact 59 which normally rests upon the upper end of a set screw 60 forming part of a contact 61. The contact member 58 could assume this position by gravity but for the purpose of rapidity and security in operation, I provide a spring 62 for securing such movement of the contact member from an upper position. A wire 63 connects one end of the magnet B with the contact 61. A wire 64 connects the contact 59 with a binding post 65. On the upper side of the contact member 58 I provide also a contact 66 which is adapted to be moved into engagement with the lower end of a set screw 67 forming part of a contact 68 from which leads a wire 69 in a circuit to be later described. A wire 70 connects the contact 66 with a binding post 71. Pivotally mounted at 72 above the magnet A is a contact member 73 which is provided on its under side with a contact 74 adapted to rest upon the upper end of a set screw 75 forming part of a contact 76. A wire 77 connects the contact 74 with a binding post 78 and a wire 79 in a circuit to be hereinafter referred to, is connected with the contact 76. Secured on the upper side of the contact member 73 is an arm 80 carrying at its outer end a contact 81 which is adapted to engage the end of a set screw 82 forming part of a contact 83 at which contact is connected a wire 84 in a circuit to be hereinafter referred to. The arm 80 is connected by a wire 85 to a binding post 86. The wire 87 connects the binding post 86 with one end of the magnet A. Wires 88, 89 respectively, connect corresponding ends of the magnet A with a common binding post 90. Located above the contact member 73 is an adjustable stop 91 for limiting the upward movement of said contact member, the latter being adapted to be pulled downward from such upward position by means of a spring 92. Between the free ends of the two contact members 58 and 73 and projecting outwardly a short distance from the switch board 48 is a switch bar 93, the lower edge of which is rounded and located in the path of movement of the upper portion of the ball 54. This switch bar co-operates with the armature 50 and ball 54 to insure a rapid upward movement of the respective contact members 58 and 73 in the following manner:

Assuming the parts to be in the position shown in Figure 2 if the magnet A were energized the armature 50 would be attracted and swung toward the right. In this movement the ball 54 must pass under the lower edge of the switch bar 93 and in so doing will compress the spring 56. As soon as it passes under the lower edge of said switch bar, the spring 56 instantly forces the said ball upward into engagement with the contact member 73 to raise the same. The same operation occurs when the armature is moved toward the left with respect to the contact member 58. However, as the ball 54 is always under one contact member or the other, and never in a neutral position, Figure 2 assumes the movement to have just occurred and the contact member 58 is not shown raised, so that the operation may be described with the circuit closed between the contacts 59 and 60. The operation of the ball 54 under the influence of the spring 56 insures a rapid and certain movement of the contact members 58 and 73 as stated, and said ball under the influence of the spring 56 tends to prevent any rebound of said contact members, after contact has once been established by their upward movement, thus tending to prevent vibration of the contact members with consequent arcing in establishing a circuit. Further, the quick movement of the contact members effected in the manner described also reduces to the minimum the arcing when the circuits are broken by the movement of the contact members as will be recognized by those skilled in the art.

Referring now to the safety device shown at the right of Figure 1, the numeral 94 indicates a switch board on which are mounted two electro-magnets 95 having a common armature 96 pivotally mounted at 97 to swing into and out of engagement with the cores of the magnets. Near the lower end of the armature, on the outer side thereof there is located a lug 98 adapted to be engaged by the hooked end 99 of the lever 100 pivoted at 101 on the switch board and having at its outer end a weight 102, which latter serves to maintain the lever in an over-balanced relation and the hook 99 in engagement with the lug 98.

Above the safety device is shown a transformer indicated generally by 103 and having, as usual, a high voltage coil 104 and a low voltage coil 105. The numerals 106, 107 indicate, respectively, wires leading from the main source of alternating current supply. The wire 106 leads direct to the binding post 78 and is thus connected direct with the contact 74. A branch wire 108 connects this wire with the primary winding 104 of the transformer. The wire 107 is connected to the armature 96. A wire 109 is connected at one end to the lever 100 and leads thence direct to one side of the motor 31, so that when the parts are in the normal position shown in Figure 1, the circuit through the wire 107 passes through the armature 96 and lever 100 direct to the motor. The other part of the motor circuit is established by the wire 79 previously referred to, which leads from the contact 76 direct to the motor. A branch wire 110 connects the wire 109 with the primary winding of the transformer. For the purpose of easy in description, the terminals of the secondary winding 105 of the transformer are indicated by the plus and minus signs. The wire 69 indicated in Figure 2 leads from the contact 68 direct to the plus side of the low voltage winding of the transformer. A branch wire 111 connects wire 69 with the binding post 90 and thus places one side of the transformer in circuit with one or the other of the magnets A and B according to the position of the armature 50. The wire 21 previously referred to as leading from one end of the thermostat 9 to the magnets 95 is continued from said magnets and connected with the wire 69. From the minus side of the transformer the wire 112 leads direct to the arm 40 of the pressure gage. As heretofore stated, a wire 43 leads from the contact 41 to one end of the primary winding of the spark coil 44. From the other end of this winding the wire 113 leads to the binding post 71. With the arm 40 at rest on the contact 41 the circuit to the spark plug will be closed whenever the armature 50 is drawn to the left to raise the contact member 58, the circuit being from contact 41 through wires 43 and 113, wire 70, contacts 66 and 67, wire 69 through the transformer and over wire 112 to arm 40. It will be observed that the circuit to the spark coil is through the low voltage side of the transformer and hence, in practice, only current due to twelve volts passes through the spark coil.

In this position of the parts, that is, in the position shown in Figure 1, the circuit to the motor is also closed. This circuit is through wires 106 and 77, contacts 74 and 75, wire 79 to the motor thence over wire 109, lever 100, armature 96 and wire 107 to the source of current. This current is of high voltage, or, in practice, 110 volts.

Finally, in the position of the parts shown in Figure 1, with the contact member 58 raised, the circuit to the magnet B is broken by the separation of the contacts 59 and 60. The circuit to the magnets A and B is controlled by a thermostat 114 mounted at one end on a base or plate 115 and having a straight end portion 116 movable between two contacts 117 and 118. From the contact 118 the wire 84, previously referred to, leads to the contact device 83. From the contact 117 a wire 119 leads to the binding post 65 and is thus connected over the wire 64 with the contact 59. A wire 120 leads from the thermostat 114 to the minus side of the secondary winding of the transformer.

The thermostat 114 is located in a room, the temperature of which is to be regulated, and according as the temperature is above or below a predetermined degree, its free end 116 will move into engagement with one or the other of the contacts 117 and 118. In the position of the parts shown in Figure 1, the temperature of the room is supposed to have fallen below the said predetermined degree, or the desired room temperature and the thermostatic bar has moved into engagement with the contact 117. Before this occurs the armature 50 will occupy a position to the right of the switch bar 93 and the contact member 58 will be in the position shown in Figure 2, that is, with the contact 59 resting on the contact 60. In this position of the parts the circuit will be closed to the magnet B from contact 117 over wires 119 and 64, contacts 59, 60, wire 63, magnet B, wires 89 and 111, wire 69 through the low voltage side of the transformer and over wire 120 to the thermostat 114. The magnet B is thus energized and draws the armature 50 to the left, or to the position shown in Figures 1 and 2, and the ball 54 engages the contact member 58 and quickly raises the same to break engagement between the contacts 59 and 60 and to bring the contact 66 into engagement with the contact 67 which is the position of the parts shown in Figure 1. This, of course, breaks the circuit to the magnet B, which is only energized for the brief interval sufficient to move the armature 50 into engagement with its core, and "sets" the magnet A so that the current will pass therethrough whenever the thermostatic bar 116 moves into engagement with the contact 118. This circuit to the magnet A will be later described. As soon as the armature 50 passes from under the contact member 73, the latter is drawn down swiftly by the spring 92 to bring the contact 74 into engagement with the contact 75 to close the circuit to the motor, which circuit has been previously described, and to close the circuit to the spark plug, which circuit has also been previously described. Combustion now occurs and almost immediately the heat of combustion affects the thermostat 9 and causes its bar 23 to move out of engagement with the contact 25 thus breaking the circuit to the magnets 95 of the safety device over the wire 21 for a reason to be presently set forth. When the motor 31 is placed in operation, the pump 33 forces the fuel through the pipe 18 and pressure is built up at the pop-valve 47 until, say, a pressure of ten pounds is reached, when this valve opens and allows the fuel to pass to the spray nozzle 11 whence it is ignited by the spark plug 8. This operation also causes pressure to be built up in the pressure gage 36 and when, say, a pressure of five pounds is reached, the end of the Bourdon tube 37 will act to raise the arm 40 from the contact 41 and thus break the circuit to the spark plug over the wire 43. The arm 40 will continue to rise, however, until it engages the contact 42 and establishes connection over the wire 27 with the contact 25. However, as the connection to the magnets 95 over the wire 21 is broken by the movement of the thermostatic bar 23 out of engagement with the contact 25 no current passes to the magnets 95. We will assume now that when the circuit to the motor was closed, as above described, for some reason, such as a short circuit in the spark plug circuit, combustion did not occur; in that event, unless preventive means were provided the oil would continue to be sprayed from the nozzle 11 and collect in the chamber 3, and the fumes thereof fill the furnace 1, so that if combustion should thereafter be produced, a dangerous explosion might occur. I have described the means for preventing such result, and will now describe the operation thereof:

Assuming combustion not to have occurred when the motor was energized, the cool air supplied by the blower 30 will play upon the thermostat 9 and cool the same so as to prevent it from moving out of engagement with the contact 25, or, if it should be out of engagement with said contact due to the action of radiant heat from the furnace or from the heat generated in a previous period of combustion, said thermostat will be cooled by the air and moved into engagement with the contact 25. This, as previously stated, will close the connection from the thermostat over the wire 27 to the contact 42 the other side of the circuit being over the wire 21 through the magnets 95, wire 21, the transformer, and wire 112 to the arm 40. With the pump 33 in operation, building up the pressure of the fuel, the arm 40 will continue to rise, as stated, until it engages the contact 42 which, as will be seen, closes the circuit to the magnets 95 which are immediately energized and attract the armature 96. This acts to move the lug 98 from engagement with the hooked end 99 of the lever 100; the weighted end 102 whereof falls. As the armature 96 moves out of contact with the end 99 of lever 100, the circuit to the motor will be broken over the wire 107 and hence the operation of the system will be at once stopped. The motor cannot again be placed in operation until the house-holder resets the safety device. Should this be done without remedying the cause of non-combustion, the magnets 95 would again be instantly energized and the armature 96 attracted to release the lever 100 and again break the circuit to the motor. It will be seen further that two contacts must be established before the circuit to the safety device is closed so that if the combustion system is operating properly, the safety device can never be brought into operation. The first of these contacts is that between the thermostatic bar 23 and the contact 25, which will normally be broken by the heat of combustion, so that when the second contact, that between arm 40 and contact 42, is established, which always occurs in operation, the circuit to the magnets 95 will not be closed.

We will now assume that combustion has continued until the temperature of the room has risen above the required degree. This will cause the thermostatic bar 116 to move into engagement with the contact 118. This will operate to close the circuit to the magnet A over wire 84, contacts 82 and 81, arm 80, wires 85 and 87 to magnet, and wires 88, 111, 69, the transformer, and wire 120 to the thermostat 114. The armature 50 will then be drawn to the right, the ball 54 engaging the underside of the contact member 73 and raising the same, thereby breaking the circuit to the motor over wire 79 by separating the contacts 74 and 75 and also simultaneously breaking the circuit to the magnet A by separating the contacts 81 and 82 through the movement of the arm 80. The stoppage of the motor, of course, stops combustion and no further combustion occurs until the temperature cools sufficiently to move the thermostatic bar 116 into engagement with the contact 117. When the armature 50 moves to the right the contact member 58 is drawn downward to again bring the contact 59 into engagement with the contact 60, which operates to again "set" the magnet B so that the circuit thereto may be closed whenever the thermostatic bar 116 engages the contact 117.

From the above description of the construction and operation, it will be seen that the room thermostat 114 handles only the low voltage current of the transformer, and that this thermostat operates solely to close the circuits to the double magnet switch which handles the high voltage motor circuit from the wires 106 and 107. Further it will be seen that I provide for a rapid action of the circuit controllers 58 and 73 while simultaneously breaking the circuit to each magnet immediately after it has been energized to operate the armature 50 and simultaneously with, or even slightly before said armature engages its core, so that vibration of the armature 50 is rendered impossible by reason of the engagement of the ball 54 with one side or the other of the switch bar 93 and arcing at the contacts established by the movement of the members 58 and 73, is reduced to the minimum. This latter result not only follows from the swift and positive movements of the contact members 58 and 73 occasioned by the action of the spring 56 on the ball 54 in breaking the contacts, but also from the fact that the pressure of said spring exerted through the ball 54 on the ends of these respective members prevents any tendency of the same to rebound.

It will also be seen that the position of the safety thermostat 9 in the combustion flue, relative to the zone of flame projection and air admission, is of great importance as, on the one hand, the heat of combustion operates the bar 23 almost instantly to prevent a possible closure of the circuit to the magnets 95 of the safety device and, on the other, should combustion not occur, the thermostat is sufficiently remote from the zone of combustion of the furnace as to be only slightly affected by radiant heat and the cold air from the fan readily effects said thermostat to cause it to move into engagement with the contact 25.

Further, it will be seen that the system as a whole provides for the automatic control of combustion, which control is effected through the temperature of the room and that all danger from explosion or fire, due to improper operation, is eliminated.

Finally, it will be seen that in the operation of the magnet switch each magnet is de-energized by the movement of the armature attracted thereby and the circuit to the other magnet automatically "set" by the fall of the contact member released by the armature, so that the room thermostat acts only to make the circuit to the magnets and never to break the same, so that all arcing at the room thermostat is prevented.

While I have referred herein to the air supplied from the fan to the combustion tube as cooling the safety thermostat 9, it will be apparent that a cooling effect on the thermostat will also be produced by the cold unignited spray of fuel; or, if a combustible mixture of air and oil were simultaneously discharged for ignition, that the play of said cool combustible mixture on the thermostat would likewise have the cooling effect referred to. As, in each instance, however, air would be involved in the action, I have referred to it as the cooling medium but such reference is not in a limiting sense.

I claim:—

1. In an oil burning heating system, means for projecting air and sprayed liquid fuel into a zone of ignition, means for igniting the fuel, a thermostat located in proximity to the zone of combustion and in the path of one of the combustion supporting elements, and means associated with said thermostat and rendered operative thereby upon projection of said fuel without ignition to render inoperative said fuel projecting means.

2. In an oil burning heating system, means for projecting air and sprayed fuel into a zone of ignition, means for igniting the fuel, a thermostat located in proximity to the zone of combustion and in the path of the projected air, and means associated with said thermostat and rendered operative thereby upon projection of said fuel without ignition to render inoperative said fuel projecting means.

3. In an oil burning heating system, means for projecting air and sprayed liquid fuel into a zone of ignition, means for igniting the fuel, a safety device operatively connected with said fuel projecting means, a pressure device actuated by said fuel projecting means, a thermostat located in proximity to the zone of combustion and in the path of one of the combustion supporting elements and associated with said safety device and said pressure device, whereby upon the projection of fuel without ignition thereof said thermostat and said pressure device will co-act to render operative said safety device to render inoperative the fuel projecting means, and whereby upon projection and ignition of the fuel said thermostat will render impossible the actuation of said safety device through the medium of said pressure device.

4. In an oil burning heating system, electrically-operated means for projecting air and sprayed liquid fuel into a zone of ignition, means for igniting the fuel, a safety device electrically connected with said fuel projecting means, a pressure device actuated from the fuel projecting means and electrically connected with said safety device, a thermostat located in proximity to the zone of combustion and in the path of one of the combustion supporting elements and electrically connected with said pressure device and said safety device, whereby, upon projection of the fuel without ignition, said thermostat will be caused to maintain a closed connection with said pressure device and said safety device so that upon actuation of the pressure device the circuit to the safety device will be closed and the latter actuated to render inoperative said fuel projecting means, and whereby, upon projection and ignition of the fuel, said thermostat will be actuated to break the connection from the safety device through the thermostat to said pressure device, so that the actuation of the latter cannot close the circuit to the safety device.

5. In an oil burning heating system, electrically-operated means for projecting air and sprayed liquid fuel into a zone of ignition, means for igniting the fuel, an electrically-operated safety device operatively associated with said fuel projecting means, a pressure device actuated by the fuel projecting means, a thermostatic make-and-break device located in proximity to the zone of combustion and in the path of one of the combustion supporting elements, a make-and-break device actuated by said pressure device, and an electric circuit including said safety device, the thermostatic make-and-break device and the make-and-break device of said pressure device, whereby, upon projection of said fuel without ignition, the said thermostatic device will maintain a closed connection in the circuit to said safety device and upon actuation of the make-and-break member of the pressure device the circuit to the safety device will be closed and the latter will be actuated to render inoperative the fuel projecting means, and whereby, upon projection and ignition of the fuel, said thermostatic member will break the connection in the circuit of the safety device and render closing of the circuit thereto by the make-and-break member of said pressure device impossible.

6. In an oil burning heating system, electrically-operated means for projecting air and sprayed liquid fuel into a zone of ignition, electrical means for igniting the fuel, a safety device electrically connected with said fuel projecting means, a pressure device actuated from the fuel projecting means, a make-and-break device actuated by said pressure device, an electric circuit including the ignition means and normally closed by a movable member of said make-and-break device, an electric circuit including the safety device and a stationary member of said make-and-break device, and a thermostatic circuit controller located in proximity to the zone of combustion and in the path of one of the combustion supporting elements and in the circuit of the safety device and the stationary member of said make-and-break device, and under conditions of low temperature normally closing said circuit, whereby, in the operation of the system, the said movable member will be moved to break the circuit to the ignition means and to close the circuit through the safety device to the thermostat so that if ignition has not occurred said safety device will be actuated to render inoperative said fuel projecting means.

7. In an oil burning heating system, electrically-operated means for projecting air and sprayed fuel into a zone of ignition, means for igniting the fuel, an electrically-operated safety-device operatively associated with said fuel projecting means and comprising an electro-magnet and an armature, a holder normally engaging said armature for retaining it out of contact with said magnet, a pressure device actuated by the fuel projecting means, a thermostatic make-and-break device located in proximity to the zone of combustion and in the path of one of the combustion supporting elements, a make-and-break device actuated by said pressure device, an electric circuit including said magnet, the thermostatic make-and-break device and the make-and-break device of said pressure device, and an electric circuit including the fuel projecting means and said armature and holder, whereby, upon projection of said fuel without ignition, the said thermostatic device will maintain a closed connection in the circuit to said magnet and upon actuation of the make-and-break member of the pressure device, the circuit to said magnet will be closed and the latter will be energized to attract the armature and move it out of engagement with said holder to break the circuit to the fuel projecting means, and whereby, upon projection and ignition of the fuel, said thermostatic member will break the connection in the circuit of said electro-magnet and render closing of the circuit thereto by the make-and-break member of said pressure device impossible.

8. In an oil burning heating system, in combination with a furnace, a conduit leading into the furnace and having at its end within the furnace a combustion chamber open at its upper side, means for promoting combustion in said chamber, and a flame spreader mounted on said chamber.

9. In an oil burning heating system, in combination with a furnace, a combustion conduit leading into the furnace and having at its end within the furnace a chamber open at its upper side, means for projecting air and sprayed liquid fuel into said conduit, means for igniting the fuel, and a flame spreader mounted on said chamber.

10. In an oil burning heating system, in combination with a furnace, a combustion conduit leading into the furnace and having at its end within the furnace a chamber open on its upper side, means for projecting air and sprayed liquid fuel into said conduit, means for igniting the fuel, and a jointed flame spreader removably mounted on said chamber.

11. In an oil burning system, electrically operated means for projecting fuel into a zone of ignition, means for igniting the fuel, a high voltage circuit including said fuel projecting means, a low voltage circuit, an electrically controlled device in said low voltage circuit for making and breaking the circuit of said fuel projecting means, and a safety device cooperating with said electrically controlled device which acts, in the case of failure of combustion, to cause the electrically controlled device to stop the electrically operated means.

12. In an oil burning system, electrically operated means for projecting fuel into a zone of ignition, means for igniting the fuel, a high voltage circuit including said fuel projecting means, a low voltage circuit, an electrically controlled device in said low voltage circuit for making and breaking the circuit of said fuel projecting means, a safety device co-operating with the electrically operated means directly responsive to and regulated by combustion conditions, said safety device operating, upon failure of combustion, to stop the electrically operated means.

13. In an oil burning system, electrically operated means for projecting fuel into a zone of ignition, means for igniting the fuel, a high voltage circuit including said fuel projecting means, a low voltage circuit, a magnet switch in said low voltage circuit for making and breaking the circuit of said fuel projecting means, and a safety device co-operating with said magnet switch which acts, in the case of failure of combustion, to cause the magnet switch to stop the electrically operated means.

14. In an oil burning system, electrically operated means for projecting fuel into a zone of ignition, means for igniting the fuel, a high voltage circuit including said fuel projecting means, a low voltage circuit, a magnet switch in said low voltage circuit for making and breaking the circuit of said fuel projecting means, a safety device co-operating with the electrically operated means directly responsive to and regulated by combustion conditions, said safety device operating, upon failure of combustion, to stop the electrically operated means.

15. In an oil burning system, electrically operated means for projecting fuel into a zone of ignition, means for igniting the fuel, a high voltage circuit including said fuel projecting means, a low voltage circuit, a magnet switch in said low voltage circuit for making and breaking the circuit of said fuel projecting means, and a safety device co-operating with said magnet switch which acts, in the case of failure of combustion, to cause the magnet switch to stop the electrically operated means.

16. In an oil burning system, electrically operated means for projecting fuel into a zone of ignition, means for igniting the fuel, a high voltage circuit including said fuel projecting means, a low voltage circuit, a magnet switch in said low voltage circuit for making and breaking the circuit of said fuel projecting means, a safety device co-operating with the magnet switch directly responsive to and regulated by combustion conditions, said safety device operating, upon failure of combustion, to stop the electrically operated means.

17. In an oil burning system, electrically operated means for projecting fuel into a zone of ignition, means for igniting the fuel, a high voltage circuit including said fuel projecting means, a low voltage circuit, an electrically controlled device in said low voltage circuit for making and breaking the circuit of said fuel projecting means, safety means co-operating with the electrically controlled device, said safety means comprising a device adapted to be brought into action when the circuit is closed to the electrically operated means, and a co-operating device responsive to combustion conditions, said devices operating, upon the failure of combustion, to effect the breaking of the circuit to the electrically operated means.

18. In an oil burning system, electrically operated means for projecting fuel into a zone of ignition, means for igniting the fuel, a high voltage circuit including said fuel projecting means, a low voltage circuit, an electrically controlled device in said low voltage circuit for making and breaking the circuit of said fuel projecting means, a room thermostat operatively associated with said electrically controlled device, and a safety device co-operating with said electrically controlled device which acts, in the case of failure of combustion, to cause the electrically controlled device to stop the electrically operated means.

19. In an oil burner for heating a heat-absorbing medium, means for projecting sprayed fuel into a zone of ignition, means for igniting the fuel, a thermostat adapted to receive a small amount of heat from the flame of combustion, said heat being transmitted to said thermostat before the flame of combustion has passed over the heat-absorbing medium, and means associated with said thermostat and rendered operative thereby upon projection of said fuel without ignition to render inoperative said fuel projecting means.

20. In an oil burner for heating a heat-absorbing medium, electrically-operated means for projecting sprayed fuel into a zone of ignition, means for igniting the fuel, a thermostat adapted to receive a small amount of heat from the flame of combustion, said heat being transmitted to said thermostat before the flame of combustion has passed over the heat-absorbing medium, and means associated with said thermostat and rendered operative thereby upon projection of said fuel without ignition to render inoperative said fuel projecting means.

21. In an oil burner for heating a furnace, means for projecting sprayed fuel into a zone of ignition, means for igniting the fuel, a thermostat adapted to receive a small amount of heat from the oil burner when the same is in operation, said thermostat being so located that when the oil burner stops, cool air from the room will be drawn over said thermostat, due to the natural draught of said furnace, and will cause said thermostat to quickly assume its position as when the burner is not in operation, means associated with said thermostat and rendered operative thereby upon projection of said fuel without ignition to render inoperative said fuel projecting means.

22. In an oil burning system, means for projecting air and sprayed liquid fuel into a zone of ignition, means for igniting the fuel, means responsive to combustion conditions located in proximity to the zone of combustion and adapted to receive radiant heat from the flame of combustion, said means responsive to combustion conditions being arranged to render the fuel projecting means inoperative in the event said fuel is projected without ignition.

23. In an oil burning heating system, an electric motor adapted to project air and sprayed fuel into a zone of ignition, means for igniting the fuel, means responsive to combustion conditions located in proximity to the zone of combustion and being acted on by radiant heat from the flame of combustion, said means being arranged to render the electric motor inoperative in the event said fuel is projected without ignition.

24. In an oil burning system, means for projecting air and sprayed liquid fuel into a zone of ignition, means for igniting the fuel, a thermostat responsive to combustion conditions located in proximity to the zone of combustion and adapted to receive radiant heat from the flame of combustion, said thermostat being arranged to render the fuel projecting means inoperative in the event said fuel is projected without ignition.

25. In an oil burning heating system, an electric motor adapted to project air and sprayed fuel into a zone of ignition, means for igniting the fuel, a thermostat responsive to combustion conditions located in proximity to the zone of combustion and being acted on by radiant heat from the flame of combustion, said thermostat being arranged to render the electric motor inoperative in the event said fuel is projected without ignition.

In testimony whereof I have hereunto set my hand.

LEWIS L. SCOTT.